US008493237B2

(12) United States Patent
Grievink et al.

(10) Patent No.: US 8,493,237 B2
(45) Date of Patent: Jul. 23, 2013

(54) PARKING ARRANGEMENT WITH AN AUTOMATIC VEHICLE DETECTION SYSTEM, AND METHOD FOR PUTTING INTO OPERATION AND MANAGING A PARKING ARRANGEMENT

(75) Inventors: Gerrit Jan Willem Grievink, Winterswijk (NL); Gerhard Johan Tannemaat, Groenlo (NL)

(73) Assignee: N.V. Nederlandsche Apparatenfabriek NEDAP, Groenlo (NL)

( * ) Notice: Subject to any disclaimer, the term of this patent is extended or adjusted under 35 U.S.C. 154(b) by 311 days.

(21) Appl. No.: 13/119,026

(22) PCT Filed: Sep. 18, 2009

(86) PCT No.: PCT/NL2009/050559
§ 371 (c)(1),
(2), (4) Date: Mar. 15, 2011

(87) PCT Pub. No.: WO2010/033024
PCT Pub. Date: Mar. 25, 2010

(65) Prior Publication Data

US 2011/0163894 A1 Jul. 7, 2011

(30) Foreign Application Priority Data

Sep. 19, 2008 (NL) ..................................... 2001994

(51) Int. Cl.
*B60Q 1/48* (2006.01)

(52) U.S. Cl.
USPC ......................... 340/932.2; 340/933; 705/418

(58) Field of Classification Search
USPC ............... 340/932.1, 933; 705/13, 418; 701/1
See application file for complete search history.

(56) References Cited

U.S. PATENT DOCUMENTS 6,147,624 A * 11/2000 Clapper ..................... 340/932.2
6,340,935 B1 * 1/2002 Hall ........................... 340/932.2

(Continued)

FOREIGN PATENT DOCUMENTS

WO 2005/111963 11/2005
WO 2006/063079 6/2006

(Continued)

OTHER PUBLICATIONS

M. J. Caruso et al., "Vehicle Detection and Compass Applications using AMR Magnetic Sensors," May 1999, Honeywell, SSEC, 13 pages, http://www.ssec.honeywell.com.

(Continued)

*Primary Examiner* — Toan N Pham
(74) *Attorney, Agent, or Firm* — Jacobson Holman PLLC

(57) ABSTRACT

A parking arrangement with parking places for vehicles and with an automatic vehicle detection system which comprises a central computer system and a wirelessly operating parking sensor module for determining the presence or absence of a vehicle in the parking place, which parking sensor module comprises at least one vehicle sensor, which provides measuring values which are representative of the presence or absence of a vehicle, provided with calibration means for determining the quiescent value, representing the absence of a vehicle, of the measuring values from the vehicle sensor, which calibration means by a self-organizing map method divide the measuring values into clusters of mutually close values, wherein the cluster having the largest number of measuring values is selected as representative of the quiescent value of the measuring values at a parking place, wherein each time an adjusted quiescent value is determined, and wherein a measuring value which differs from the quiescent value by more than a predetermined threshold value indicates that a vehicle is situated in the parking place.

17 Claims, 2 Drawing Sheets

U.S. PATENT DOCUMENTS

| | | | | |
|---|---|---|---|---|
| 6,344,806 | B1 | 2/2002 | Katz | |
| 6,646,568 | B2 * | 11/2003 | MacPhail et al. | 340/932.2 |
| 6,885,311 | B2 * | 4/2005 | Howard et al. | 340/932.2 |
| 6,970,101 | B1 * | 11/2005 | Squire et al. | 340/932.2 |
| 7,391,339 | B2 * | 6/2008 | Howard et al. | 340/932.2 |
| 7,868,784 | B2 * | 1/2011 | Kuo et al. | 340/932.2 |
| 2005/0190077 | A1 | 9/2005 | Kavaler | |
| 2006/0136131 | A1 | 6/2006 | Dugan | |
| 2006/0170566 | A1 | 8/2006 | Slemmer | |
| 2006/0212344 | A1 | 9/2006 | Marcus | |

FOREIGN PATENT DOCUMENTS

| | | |
|---|---|---|
| WO | 2007/027818 | 3/2007 |
| WO | 2007/027945 | 3/2007 |
| WO | 2008/061099 | 5/2008 |

OTHER PUBLICATIONS

Ara N. Knaian, "A Wireless Sensor Network for Smart Roadbeds and Intelligent Transportation Systems," Jun. 2000, Massachusetts Institute of Technology, 51 pages.

M. J. Caruso et al., "A New Perspective on Magnetic Field Sensing," May 1998, Honeywell, SSEC, 19 pages, http://www.ssec.honeywell.com.

J. Ding et al., "Vehicle Detection by Sensor Network Nodes," Oct. 1, 2004, California Partners for Advanced Transit and Highways (PATH), Institute of Transportation Studies, University of California at Berkeley, 53 pages.

* cited by examiner

PARKING ARRANGEMENT WITH AN AUTOMATIC VEHICLE DETECTION SYSTEM, AND METHOD FOR PUTTING INTO OPERATION AND MANAGING A PARKING ARRANGEMENT

This is a national stage of PCT/NL09/050559 filed Sep. 18, 2009 and published in English, which claims the priority of The Netherlands number 2001994 filed Sep. 19, 2008, hereby incorporated by reference.

The invention relates to a parking arrangement with parking places for vehicles and with an automatic vehicle detection system which comprises a central computer system and at each of at least a number of the parking places at least one wirelessly operating parking sensor module for determining the presence or absence of a vehicle in the respective parking place, which parking sensor module comprises at least one vehicle sensor in the form of at least one magnetic sensor, which in operation provides measuring values, which are representative of the presence or absence of a vehicle.

In the following description, "parking place" or "parking spot" is understood to mean a parking bay or parking space for a single vehicle. "Parking arrangement" is understood to mean an array of a number of parking places, such as for instance a parking lot, a parking zone, a parking lane or the like. "Vehicle" is understood to mean any type of vehicle that can be placed in a parking place, such as for instance a car, van, bus, trailer, etc.

For detecting vehicles, often use is made of induction loops arranged in the road surface. Through the presence of a car, the electrical properties of the induction loop change. To obtain properly measurable results, the surface of the loop must be large. In WO2008/061099 "Space monitoring detector", Noel II describes a system for detecting the occupation of parking places based on this loop principle. The system consists of an induction loop which is so large that several cars fit on it. Each car coming above the loop brings about a (small) change of the self-induction of this loop. By means of a learning algorithm, the relation between the self-induction of the loop and number of cars on the loop is determined. An important disadvantage of this solution is that arranging the cable work of the loop is a major operation. To improve accuracy, Noel II proposes to use multiple induction loops, which renders installing such a system still more laborious. Another disadvantage of this method is that in order to calibrate the system, cars need to be added and displaced in a controlled manner. In case of modifications in the installation, this laborious calibration needs to be repeated.

The Honeywell publication entitled "Vehicle Detection and Compass Applications using AMR Magnetic Sensors", by Michael J. Caruso et al. from May 1999, describes inter alia the use of magnetic field sensors to detect moving or stationary vehicles, as trains or cars. The sensors measure the strength of the earth's magnetic field in one or more dimensions. The publication describes the use of a three-dimensional magnetic sensor module, which can measure the disturbance of the earth's magnetic field, caused by a moving or stationary car, in three dimensions (x, y and z). The sensors described are of the anisotropic magnetoresistive type.

In the master's thesis of Ara N. Knaian of June 2000 entitled "A Wireless Sensor Network for Smart Roadbeds and Intelligent Transportation Systems" the use is described of magnetic field sensors arranged in a roadbed to detect passing cars. The speed of the cars is determined and the number of passing cars is counted; The magnetic sensors are included in a sensor module, which furthermore comprises inter alia a temperature sensor, a microcontroller, a radio transmitter and a lithium battery. The sensor module can further detect conditions on the road surface, such as for instance the presence of water or ice. The data obtained by the sensor module are wirelessly transmitted by the radio transmitter of the module to a remote receiving device and processed further. These data are used to inform road users timely of traffic jams, iciness and the like and possibly to divert them by alternative routes.

Further known from various patent publications is the use of magnetic field sensors for detecting vehicles in the context of a parking management system. In this connection, reference is made to WO 2006/063079 (Metertek), US 2005/0190077 (Sensys Networks), and WO 2007/027818 (Sensact Applications).

A problem occurring in the use of magnetic sensors for detecting the disturbance of the earth's magnetic field caused by a vehicle, such as for instance a car, is that these disturbances are sometimes slight in one or more measuring directions. Also, the changes of the magnetic field with respect to the quiescent value (this is the measured field strength when no vehicle is present), when a car moves over a magnetic sensor, have a rather erratic course, and in certain positions of a car with respect to the magnetic sensor, actually, zero points may occur. A measurement in three dimensions leads to an improvement but not to a complete solution of this problem, because the zero points in the three measuring directions may coincide in whole or in part. When a car is brought to a stop at such a zero point, the magnetic sensor does not provide a conclusive answer on the occupation of the parking spot.

A complicating factor, finally, is that the value of a vehicle-induced earth's magnetic field disturbance detected by a magnetic sensor not only depends on the position of the vehicle with respect to the magnetic sensor, but also may differ from one vehicle to another. The amount and distribution of the ferromagnetic material in the vehicle plays a role here.

Augmenting the sensitivity with which changes in the magnetic field strength can be measured can in principle lead to clearer measuring results.

The invention is based on the idea that in order for a detection of the presence or absence of a vehicle in a parking place to be as reliable as possible, it is important that the quiescent value of the magnetic field at the respective parking place, that is, at the magnetic sensor associated with that respective parking place, be determined as accurately as possible. Only then is it possible to determine small deviations from the quiescent value.

As already noted, the quiescent value of the magnetic field is the measured field strength when no vehicle is present in the parking place. Determining the quiescent value or calibrating the vehicle detection system is cumbersome in practice because this would require the whole parking arrangement to be cleared then, or would require visually determining per parking place whether it is unoccupied. In the latter case, though, an additional problem would be that vehicles in neighboring parking places may disturb the quiescent value.

Comparable problems can occur in the use of other types of vehicle sensors, as for instance infrared sensors, which detect a reflected amount of infrared light. Such infrared sensors hence are not telemeters, which measure the time interval between a transmitted infrared signal and a received reflection, but reflectometers, which measure solely the amount of reflected infrared light. Infrared telemeters are relatively costly and consume much energy. Infrared reflectometers, however, are less costly and can be made of comparatively low-energy design. Consequently, infrared reflectometers are better suited to be used in a wirelessly operating parking sensor module.

A drawback of infrared reflectometers is that, unlike magnetic sensors, they are very sensitive to fouling. In case of indoor use, however, as for instance in a parking garage, this problem is not very serious because normally much less fouling then occurs.

On the other hand, also in the use of vehicle sensors that work with infrared reflection measurement, a good calibration is important, because the reflection by the ceiling in a parking garage sometimes differs little from the reflection by the underside of some cars.

The object of the invention is to provide a solution to the calibration problem outlined and more generally to provide a reliably operating vehicle detection system for a parking arrangement.

According to the invention, a parking arrangement of the above-described kind is characterized by calibration means for determining the quiescent value, representing the absence of a vehicle, of the measuring values of the at least one vehicle sensor, which calibration means are configured, by a self-organizing map method, to divide the measuring values provided by a vehicle sensor into clusters of mutually close values, wherein the cluster having the largest number of measuring values is selected as representative of the quiescent value of the measuring values at the respective parking place, and wherein after each new measuring value which is added to the largest cluster an adjusted quiescent value is determined, and wherein a measuring value which differs from the quiescent value by more than a predetermined threshold value indicates that a vehicle is situated in the parking place.

A method for putting into operation and managing a parking arrangement of the above-described kind is characterized in that for determining the quiescent value of the measuring values, representing the absence of a vehicle, in operation varying in time at each parking place, a calibration method is used wherein by a self-organizing map method individually for at least a number of the parking places the measuring values coming from the vehicle sensors associated with the respective parking places are divided into clusters of mutually close values, wherein from the cluster having the largest number of measuring values the quiescent value of the measuring values at the respective parking place is determined, and wherein after each new measuring value which is added to the largest cluster an adjusted quiescent value is determined, wherein a measuring value differing from the quiescent value by more than a predetermined threshold indicates that a vehicle is situated in the parking place.

In the following, the invention will be further described with reference to the appended drawing.

Figure 1:
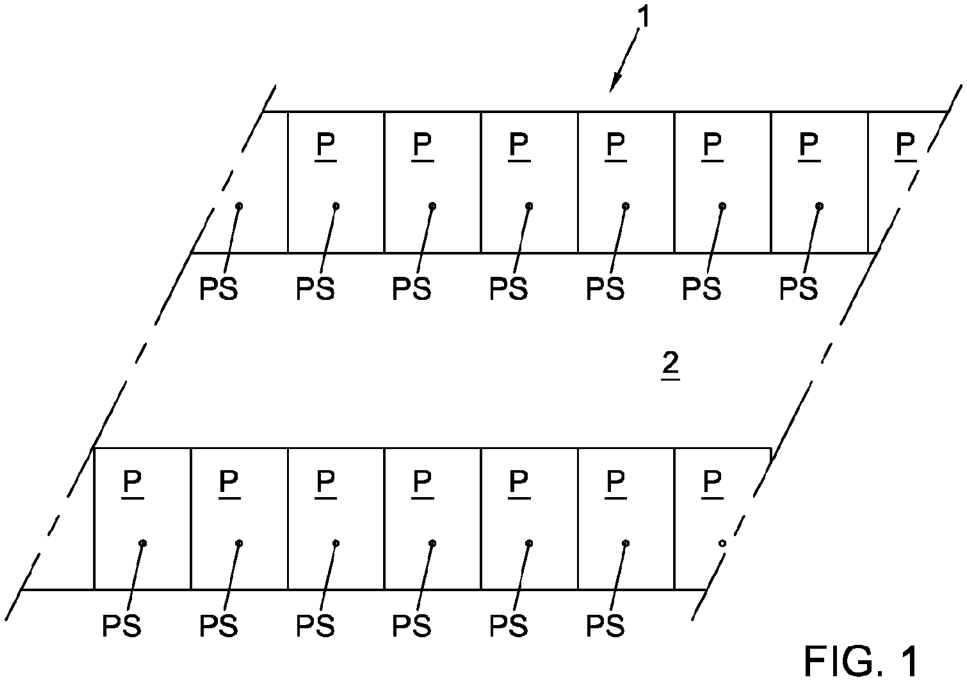
FIG. 1 shows schematically in top plan view an example of a part of a parking arrangement where the invention can be used.

FIG. 1 shows schematically in top plan view an example of a part of parking arrangement 1 where the invention can be used. The parking arrangement shown comprises a roadway 2, which may for instance be a public road or a roadway within a parking lot or a parking garage or the like. In this example, on either side of the roadway are parking spaces P, which are each provided with at least one parking sensor module, which is part of an automatic vehicle detection system (VDS, FIG. 4) and which can detect the presence or absence of a vehicle in a parking space. In each parking space P, one parking sensor module PS is drawn. The parking sensor modules are indicated only schematically and may also be situated at a different position with respect to the parking space boundaries than the positions shown. The parking sensor modules, also briefly referred to as parking sensors, sensors, sensor modules or modules, are preferably wirelessly operating modules, which, in addition to the sensors proper, may also include a microcontroller, a transmitting section and a long life battery, for instance a lithium battery, and possibly other elements, as will be described in more detail in the following with reference to FIG. 4.

The sensor modules are thus relatively simple to place, at low installation costs. The sensor modules are radiographically in communication with a central computer system 40 (FIG. 4) of the vehicle detection system VDS. The sensor modules PS are preferably arranged in a protective housing embedded in the surface of the parking spaces.

The sensor modules comprise one or more magnetic sensors, which can detect the strength of the earth's magnetic field. Preferably, three-dimensional magnetic sensors are used, which can measure three different dimensions (x, y, and z) of an earth's magnetic field. Such sensors are for instance manufactured and marketed by Honeywell.

Magnetic sensors consume little energy and are hence very suitable for use in battery-supplied sensor modules.

Figure 2:
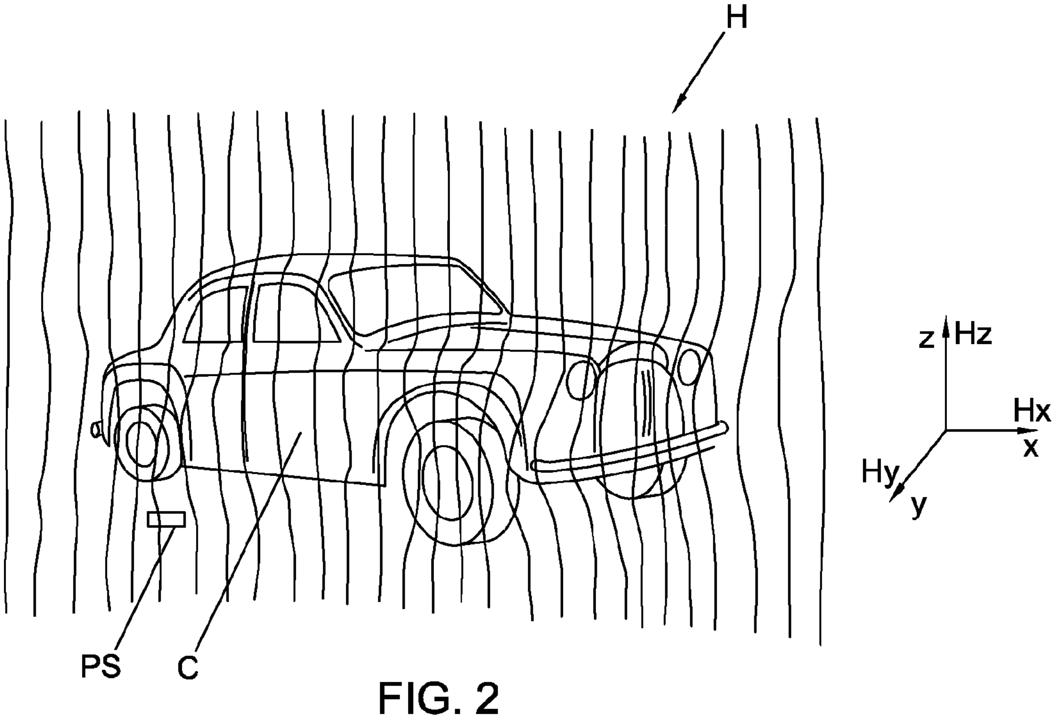
FIG. 2 shows schematically an example of the disturbance of the earth's magnetic field caused by a car.

FIG. 2 shows schematically the earth's magnetic field H and a disturbance thereof such as it could be caused by a car C. It is noted that the field lines in FIG. 2 are drawn for illustrative purposes only. The disturbance of the earth's magnetic field actually occurring may be quite different and depends on the distribution of ferromagnetic material of the car. With a three-dimensionally operating magnetic sensor module, the magnitude of the three orthogonal components in the x, y and z directions, or the field vectors Hx, Hy and Hz, can be measured and hence also the change thereof in the presence of a vehicle above the sensor PS.

As has already been noted in the introduction of the description, the disturbance of the earth's magnetic field by a moving car has a rather erratic course and the changes with respect to the quiescent value, that is, the strength of the earth's magnetic field when no car is present, are sometimes slight. Even zero points (that is, no change with respect to the quiescent value) may occur. Furthermore, the disturbance of the earth's magnetic field actually caused by a car depends on the type of car, because the distribution of ferromagnetic material differs per type of car. Also the loading can play a role in this connection. For instance, a tool box may contain much ferromagnetic material.

In addition, ambient factors are relevant, such as the occupancy of neighboring parking spaces. The varying occupancy of neighboring parking spaces has as a result that the quiescent value at an individual parking spot is not constant. In this way, the quiescent value prior to arrival of a car may differ from the quiescent value after that car has exited from a parking spot.

According to the invention, the problems outlined are solved by determining at suitable times for each parking space again and again the (varying) quiescent value of the magnetic field at that parking place.

In a parking arrangement in operation, there is a continuous coming and going of cars at a parking spot. As a result of the earlier-indicated factors, when above a magnetic sensor module a car arrives or leaves, often a different disturbance of the earth's magnetic field occurs than was the case with the preceding car.

The quiescent value of the magnetic field at a parking space is composed in that, after each detected change of the earth's magnetic field, the measured field vectors are divided into a number of clusters of mutually close values. Here, use is made of an arithmetic technique which is also designated as SOM (self-organizing map) and has been developed by Teuvo Kohonen, which is why it is sometimes called Kohonen map.

The use of this arithmetic technique within the framework of the invention is explained below with reference to FIG. 3.

Figure 3:
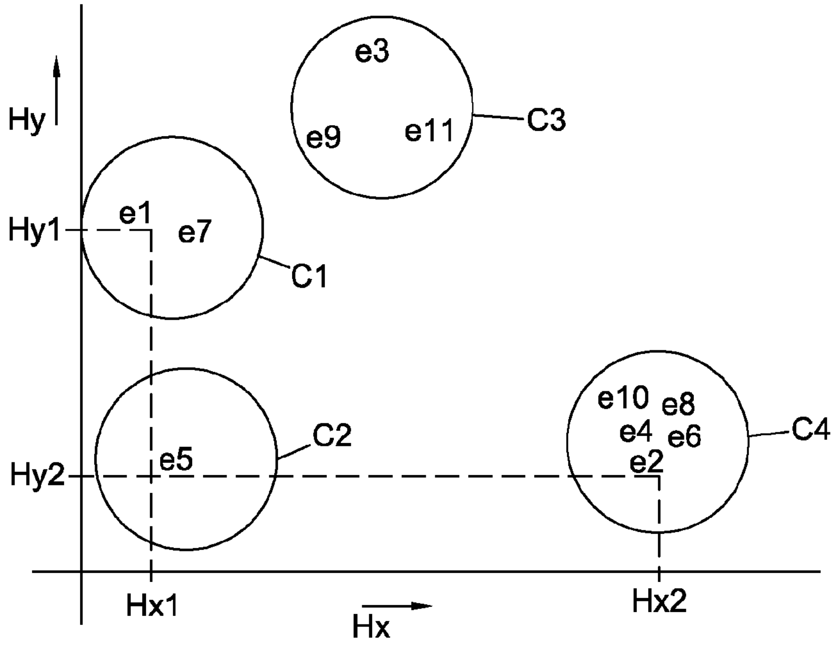
FIG. 3 illustrates a calibration method for a parking arrangement according to the invention.

FIG. 3 shows schematically a two-dimensional representation of measuring values of the x-component Hx and the y-component Hy of the magnetic field at a parking space. The figure shows by way of example four circles C1, C2, C3 and C4. These circles each represent a cluster of measuring values of the magnetic field. Each time when a value of the magnetic field measured by a sensor deviates from the previous measuring value by more than a predetermined, settable, threshold value, it is assumed that a relevant "event" has taken place. An event is the entry or exit of a car at a parking space. In the example shown, 11 "events" are shown, indicated by e1, e2 . . . e11. Event e1 represents the measuring values Hx=Hx1 and Hy=Hy1. Event e2 represents the measuring values Hx=Hx2, Hy=Hy2, etc.

FIG. 3 shows by way of example the measuring values of eleven measurements.

Since an "event" in each case involves a transition from a situation where a car is in the parking space to a situation where no car is in the parking space, or the other way around, an event representing the entry of a car, that is, "parking spot occupied", occurs as often as an event representing the departure of a car, that is, "parking spot vacant".

Both types of events therefore occur equally often. Since each car, or at least each type of car, causes its own individual disturbance of the earth's magnetic field, the condition where there is actually a car in the parking space, that is, the event of "parking spot occupied", will entail a much greater spread of measuring values than the event of "parking space vacant". When presently measuring values with a slight mutual difference are clustered, different clusters are formed, as indicated by way of example at C1 to C4 in FIG. 3.

Since the measuring values associated with the event of "parking spot vacant" will mutually show only relatively small differences, these will all end up in the same cluster, whereas the measuring values of wider spread associated with the event of "parking spot occupied" will end up in a number of different clusters. In FIG. 3 it can be seen that cluster C4 contains most measuring values. This cluster therefore contains the measuring value associated with the event of "parking spot vacant". In other words: cluster C4 represents the quiescent value (also called zero value) of the earth's magnetic field. As an effective quiescent value, for instance the center of gravity of the cluster or the center of a circle surrounding the cluster may be chosen. The other clusters C1 to C3 represent the presence of different (types of) cars in the parking spot.

After an initial clustering, upon each new measurement the distance of the obtained measuring value to the centers of gravity or centers of the clusters is determined. If this distance for one of the clusters is smaller than a predetermined threshold value, the respective measuring value is added to that cluster. Also, a new center of gravity or center of the cluster is determined taking the newly added measuring value into account.

For the parking sensor, only the largest cluster, representing the quiescent value, is relevant. If the distance between an instantaneous measuring value and the center of gravity or center of the largest cluster is greater than a predetermined, settable threshold value, a car has been detected in the parking spot.

By continuously determining the largest cluster of measuring values as well as the center of gravity or center thereof for each parking spot of a parking arrangement in the manner described, for each parking spot the instantaneous quiescent value of the magnetic field at the parking spot is obtained. On the basis of this, it can be determined with a high degree of accuracy whether a car is being parked in the parking spot, or is leaving the parking spot.

It is noted that FIG. 3 shows a schematic representation of random measuring values intended to elucidate the calibration method. In a practical situation, however, wholly different clusters of measuring values may occur.

Furthermore, FIG. 3 shows an example with two-dimensional measuring values. Although in principle it is possible to work with two-dimensional measuring values, in practice it will often be elected to use a three-dimensional measurement of the earth's magnetic field and the disturbance thereof. In that case, clustering of measuring values will accordingly be based on calculations in a three-dimensional space.

In that case, as a center of a cluster, the center of a sphere enclosing the cluster may be chosen. In general, this involves the area covered by a cluster, or the representation thereof by a limitation enclosing the cluster area, for which purpose for instance a suitable geometric figure may be chosen. With a one-dimensional cluster, for instance the midpoint or center of gravity of a line including the cluster values may then be chosen. With a two-dimensional cluster, use can be made of a suitable closed boundary line such as for instance a circle, a triangle or a square or rectangle or other suitable boundary line. With a three-dimensional cluster, use can be made of a suitable closed surface, such as for instance a sphere or a cube or other suitable three-dimensional geometric figure.

The measuring values measured by a sensor module, as already indicated, are preferably wirelessly transferred to a central computer system of the vehicle detection system. Preferably, to this end, sensors of other parking spots are used as intermediate station. Each sensor should then, in addition to a transmitting section, include a receiving section. The transmitting section of a sensor module transmits a signal, which contains the measuring value of an event together with a sensor module identification code and hence also the associated parking spot-identifying code, to the central computer system. Whether there is indeed an event involved can be determined, after an initial period of clustering, by the microcontroller of the sensor module. In that case, the quiescent value determined by the central computer system is to be sent back to the respective sensor module.

It is also possible to determine in the central computer system whether an event is involved, but that requires more (transmitting) energy on the part of the sensor module. Furthermore, the sensor module preferably works intermittently to save energy. The central computer system is provided with suitable software to apply the calibration method described.

A vehicle detection system as described above can be used to determine whether the parking arrangement is to be regarded as full up, or has room left for more cars. Since at all times it is known of each parking place of the parking arrangement whether that parking place is vacant or filled, the vehicle detection system can also be used to guide a driver to a vacant parking space using, for instance, alphanumerical displays, illuminated arrows and the like.

If the parking arrangement is provided with alerting means generating an alert signal when a predetermined parking time period is being exceeded, a parking time counter should be active for each parking place. The parking time counter may then, for instance, be reset each time when an event occurs. Such alerting means and parking time counters may be part of the central computer system of the parking arrangement.

To obtain extra certainty about the occupancy of a parking space, if desired, other sensors besides the magnetic sensors may be used.

A major advantage of the use of magnetic field sensors is that they are little sensitive, if at all, to most kinds of fouling and consume only a slight amount of energy. A disadvantage is that the detection signals of magnetic field sensors are relatively weak. Extra certainty can be obtained by combining the magnetic field sensors with other types of sensors or detectors. An important drawback of other types of sensors, such as for instance infrared telemeters, radar detectors and the like, is that they are relatively costly and consume much energy and hence are less suited for wireless applications, and that such sensors are sensitive to fouling and snow or ice.

According to the invention, these problems may at least partly be obviated by switching on a high energy consuming sensor only if, with a magnetic field sensor, an event has been detected. In addition, the high energy consuming sensor could be switched on, for instance, once per unit time, for instance once a minute. For the calibration of such extra sensors, if desired, also use can be made of a calibration method as described above.

Figure 4:
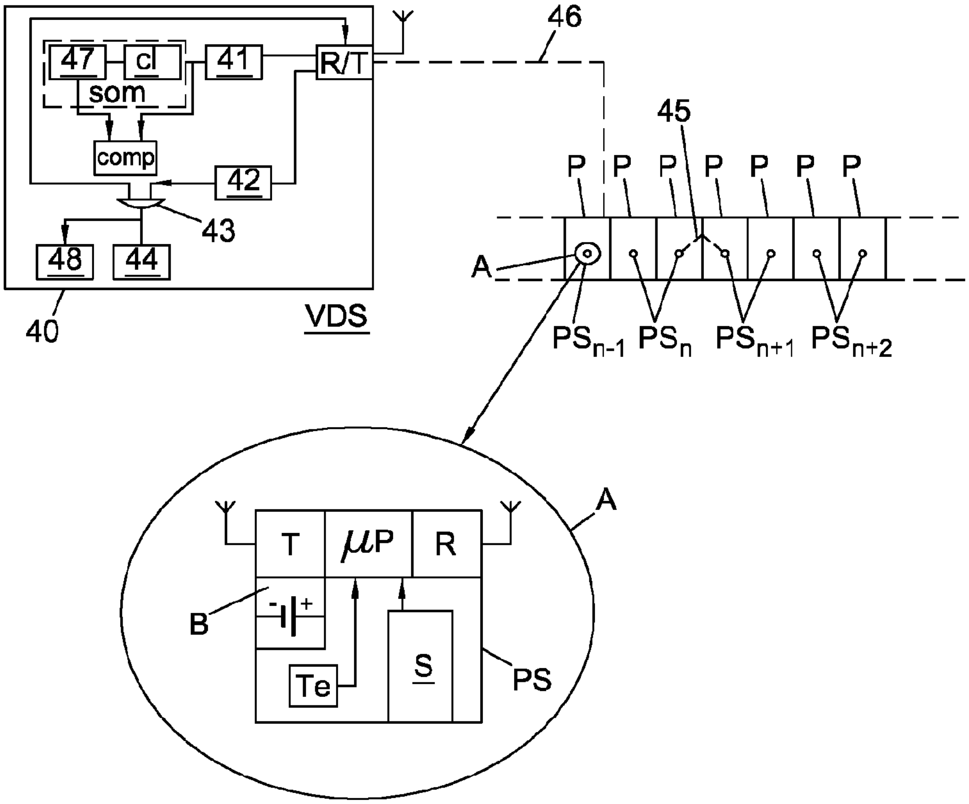
FIG. 4 shows schematically an example of a vehicle detection system of a parking arrangement according to the invention.

FIG. 4, for the sake of completeness, shows highly schematically an example of a vehicle detection system according to the invention. FIG. 4 again shows schematically a number of parking places P which are provided with parking sensor modules PS. The parking sensors PS can communicate wirelessly with a central computer system 40, as indicated with a broken line 46. With advantage, just one or more parking sensors located close to the central computer system or a transmitting/receiving section thereof communicate directly with the central computer system, while parking sensors located further away in turn communicate, if necessary via intermediate sensors, wirelessly with the sensors located close to the central computer system 40, which then forward the received signals to the central computer system. The communication of parking sensor modules with each other is schematically indicated for a couple of modules with the broken line 45. FIG. 4 shows schematically at A an example of the structure of one of the parking sensors. PS. The parking sensor PS shown includes a block S which represents one or more vehicle sensors. Besides a preferably three-dimensionally working magnetic sensor, this may for instance be an infrared sensor or other type of vehicle detector. The vehicle sensors are periodically set into operation by a microcontroller μP. The microcontroller may also receive signals from other types of sensors, if present, which may for instance comprise a temperature sensor, a water sensor and the like. Such other types of sensors are indicated with block Te. Further, a long-life battery B, for instance a lithium battery, is present. The microcontroller is furthermore connected with a receiving section R and a transmitting section T with associated antenna(s) for wireless communication with other parking sensor modules or with the central computer system 40.

The central computer system 40 is provided with a transmitting/receiving section RJT which is connected with a quantification device 41 for signals from the magnetic sensor.

The quantification device 41 is connected with a calibration device SOM, which carries out the above-described calibration method. The calibration device comprises clustering means and an element 47 for determining the quiescent value of the magnetic field. The output of the element 47 is connected with a comparator Comp, which compares the quiescent value provided by the element 47 with newly received measuring signals at the output of the quantification device 41. When a newly received signal deviates from the quiescent value by more than a predetermined, settable threshold value, the comparator can for instance provide a signal to an occupancy meter 44, which, for instance, updates the number and the location of occupied and/or vacant parking places. The comparator may for instance also control a parking time counter 48. Furthermore, the output signal of the comparator is supplied to the transmitter/receiving section R/T to be sent back to the parking sensor if the latter additionally includes another type of vehicle sensor. The comparator signal then serves to activate that other vehicle sensor. In that case, the central computer system may further comprise a second quantification device 42, as well as an AND gate element 43 connected with the outputs of this quantification device and the comparator Comp, and which may for instance provide a reset signal to the occupancy meter 44 and the parking time counter 48 when both inputs receive a positive detection signal, that is, a signal indicating that in the parking place of the parking sensor PS a vehicle has been detected. For every parking place, a separate parking time counter is present. The functions described for the central computer system are preferably, as far as possible, implemented through software and may at least partly be carried out in timesharing for the different parking places.

As indicated above, in an indoor situation, also infrared reflection sensors may be used, which have a transmitting section and a receiving section and which can detect the presence or absence of a vehicle in a parking place, by periodically emitting a short (for instance 10 μsec) infrared light pulse of a predetermined strength and then measuring the amount of reflected light.

In a parking garage too, however, fouling can occur, so that the quiescent value resulting from reflection by a ceiling of the parking place varies in time. In addition, it holds, as in vehicle detection with magnetic sensors, that obtained measuring values may differ from one vehicle to another.

In this situation, a vehicle detection system may be calibrated in a manner corresponding to that described above in respect of magnetic sensors. An “event” occurs when a measuring value deviates from the preceding measuring value by more than a predetermined threshold value. By dividing these measuring values into clusters of mutually close values, again a largest cluster is formed, from which, in a same manner as with the measuring values of magnetic sensors, a quiescent value representing the situation where the parking place is not occupied, is determined.

A conventional procedure in the use of infrared reflection measurement is to set a fixed level of the transmitting power and then to measure the received amount of reflected infrared light.

It is possible to save energy by continuously regulating the transmitting level, such that continuously a clearly measurable reflection signal of a predetermined value occurs. The instantaneous power level of the infrared transmitting section is then a measure for the reflected amount of light and indicates whether the parking place is occupied or not. The infrared receiving section, to save energy, is activated only after a transmitter pulse has been transmitted by the transmitting section.

It is furthermore possible to combine infrared reflection sensors measuring the reflected amount of infrared light with the earlier-described magnetic sensors and/or with other sensors, as also indicated hereinabove with regard to the magnetic sensors.

It is noted that after the foregoing, various modifications will be clear to those skilled in the art. For instance, if desired, more than one sensor module per parking place may be used. If different types of vehicle sensors are used, these may be combined in one and the same module or, conversely, in different modules, whether or not with different housings and whether or not spaced apart in a parking place. Such modifications are understood to be covered within the framework of the invention as defined in the appended claims.

The invention claimed is:

1. A parking arrangement with parking places for vehicles and with an automatic vehicle detection system which comprises a central computer system and at each of at least a number of parking places at least one wirelessly operating parking sensor module for determining a presence or absence of a vehicle in the respective parking place, which parking sensor module comprises at least one vehicle sensor, which in operation provides measuring values which are representative of the presence or absence of the vehicle, characterized by calibration means for determining a quiescent value, representing the absence of the vehicle, of the measuring values of the at least one vehicle sensor, which calibration means are configured, by a self-organizing map method, to divide the measuring values provided by the vehicle sensor into clusters of mutually close values, wherein the cluster having a largest number of measuring values is selected as representative of the quiescent value of the measuring values at the respective parking place, and wherein after each new measuring value which is added to the largest cluster an adjusted quiescent value is determined, and wherein the measuring value which differs from the quiescent value by more than a predetermined threshold value indicates that the vehicle is situated in the parking place.

2. The parking arrangement according to claim 1, characterized in that the calibration means are configured to use only measuring values that differ from a preceding measuring value by more than a predetermined threshold value.

3. The parking arrangement according to claim 2, characterized in that, as an average value, a center of gravity or center of the cluster or of a geometric figure enclosing the cluster is determined.

4. The parking arrangement according to claim 1, characterized in that the calibration means are configured to determine the quiescent value by calculating an average value of the measuring values in the largest cluster.

5. The parking arrangement according to claim 1, characterized in that the at least one vehicle sensor comprises at least one magnetic sensor, which in operation provides measuring values which represent a strength of the earth's magnetic field, or the change thereof caused by a vehicle, at a parking place.

6. The parking arrangement according to claim 5, characterized in that the magnetic sensor is a three-dimensionally measuring sensor.

7. The parking arrangement according to claim 5, characterized in that a parking sensor module comprises, in addition to a vehicle sensor comprising at least one magnetic sensor and/or infrared reflection sensor, at least one other type of vehicle sensor.

8. The parking arrangement according to claim 7, characterized in that the vehicle detection system is configured to activate the other type of vehicle sensor if a magnetic sensor and/or an infrared reflection sensor has provided a measuring value indicating that a vehicle is situated in the parking place.

9. The parking arrangement according to claim 7, characterized in that the other type of sensor is an infrared telemeter.

10. The parking arrangement according to claim 1, characterized in that the at least one vehicle sensor comprises at least one infrared reflection sensor with a transmitting section, which in operation transmits infrared light, and a receiving section, which in operation provides measuring values which represent a amount of reflected infrared light.

11. The parking arrangement according to claim 1, characterized in that parking sensor modules located close to the central computer system or a receiving section thereof are configured to communicate wirelessly with the central computer system direct, and that parking sensor modules located further away can communicate wirelessly with the central computer system via one or more intermediate parking sensor modules functioning as intermediate station.

12. A method for putting into operation and managing a parking arrangement with parking places for vehicles and with an automatic vehicle detection system which comprises a central computer system and at each of at least a number of the parking places at least one wirelessly operating parking sensor module for determining a presence or absence of a vehicle in the respective parking place, which parking sensor module comprises at least one vehicle sensor, which in operation provides measuring values which are representative of the presence or absence of the vehicle in the parking place, characterized in that for determining a quiescent value of the measuring values, representing the absence of the vehicle, in operation varying in time at each parking place, a calibration method is used, wherein by a self organizing map method individually for at least a number of the parking places the measuring values coming from the vehicle sensors associated with a respective parking places are divided into clusters of mutually close values, wherein from the cluster having a largest number of measuring values the quiescent value of the measuring values at the respective parking place is determined and wherein after each new measuring value which is added to the largest cluster an adjusted quiescent value is determined, wherein a measuring value which differs from the quiescent value by more than a predetermined threshold indicates that the vehicle is situated in the parking place.

13. The method according to claim 12, characterized in that only measuring values that differ from a preceding measuring value by more than a predetermined threshold value are included in the clustering.

14. The method according to claim 12, wherein in a parking sensor module, as a vehicle sensor, a magnetic sensor and/or an infrared reflection sensor is used.

15. The method according to claim 14, wherein in a parking sensor module, in addition to a magnetic sensor and/or an infrared reflection sensor, another type of vehicle sensor is used, which is activated if the magnetic sensor and/or infrared reflection sensor provides a measuring value which indicates that the vehicle is situated in the parking place.

16. The method according to claim 15, characterized in that the other type of vehicle sensor is an infrared telemeter.

17. The method according to claim 14, wherein an infrared reflection sensor is used and wherein in operation a transmitting power of the transmitting section is regulated, such that a reflection signal of a predetermined value is obtained, wherein on a basis of the instantaneous transmitting power, it is determined whether a parking place is occupied.

* * * * *